United States Patent [19]

Kile

[11] 4,022,106

[45] May 10, 1977

[54] PORTABLE MULTI-PURPOSE MACHINE TOOL

[76] Inventor: Walter A. Kile, Star Route, Box 142, Fall Creek, Oreg. 97438

[22] Filed: Dec. 5, 1975

[21] Appl. No.: 637,846

[52] U.S. Cl. .............................. 90/12 R; 90/15 R; 90/17
[51] Int. Cl.² ...................... B23C 1/12; B23C 1/20
[58] Field of Search ............. 90/12 R, 16, 17, 15 R; 408/236, 237

[56] References Cited

UNITED STATES PATENTS

| | | | |
|---|---|---|---|
| 1,392,549 | 10/1921 | Barnes | 90/15 R |
| 1,519,351 | 12/1924 | Blood | 408/237 |
| 2,664,789 | 1/1954 | Tree | 90/17 |
| 3,806,691 | 4/1974 | Roach | 90/17 |

*Primary Examiner*—Gil Weidenfeld
*Attorney, Agent, or Firm*—James D. Givnan, Jr.

[57] ABSTRACT

A machine tool including a bed for temporary attachment to a large size work piece for performing machining operations thereon. A carriage is slidably mounted on the bed ways and includes its own feed arrangement for movement of a carriage mounted column assembly. The column assembly in addition to moving along perpendicular axes may be positioned about its lengthwise axis. Entrained on column ways is a slide positioned by a column feed arrangement, the slide in turn rotatably supporting a powerhead assembly within which a cutter or boring tool is carried. Segmented locking rings permit locking of the column assembly slides in an adjusted position to permit universal presentation of the tool to a work piece. Brackets mount the tool bed in an upright position on the work piece.

2 Claims, 4 Drawing Figures

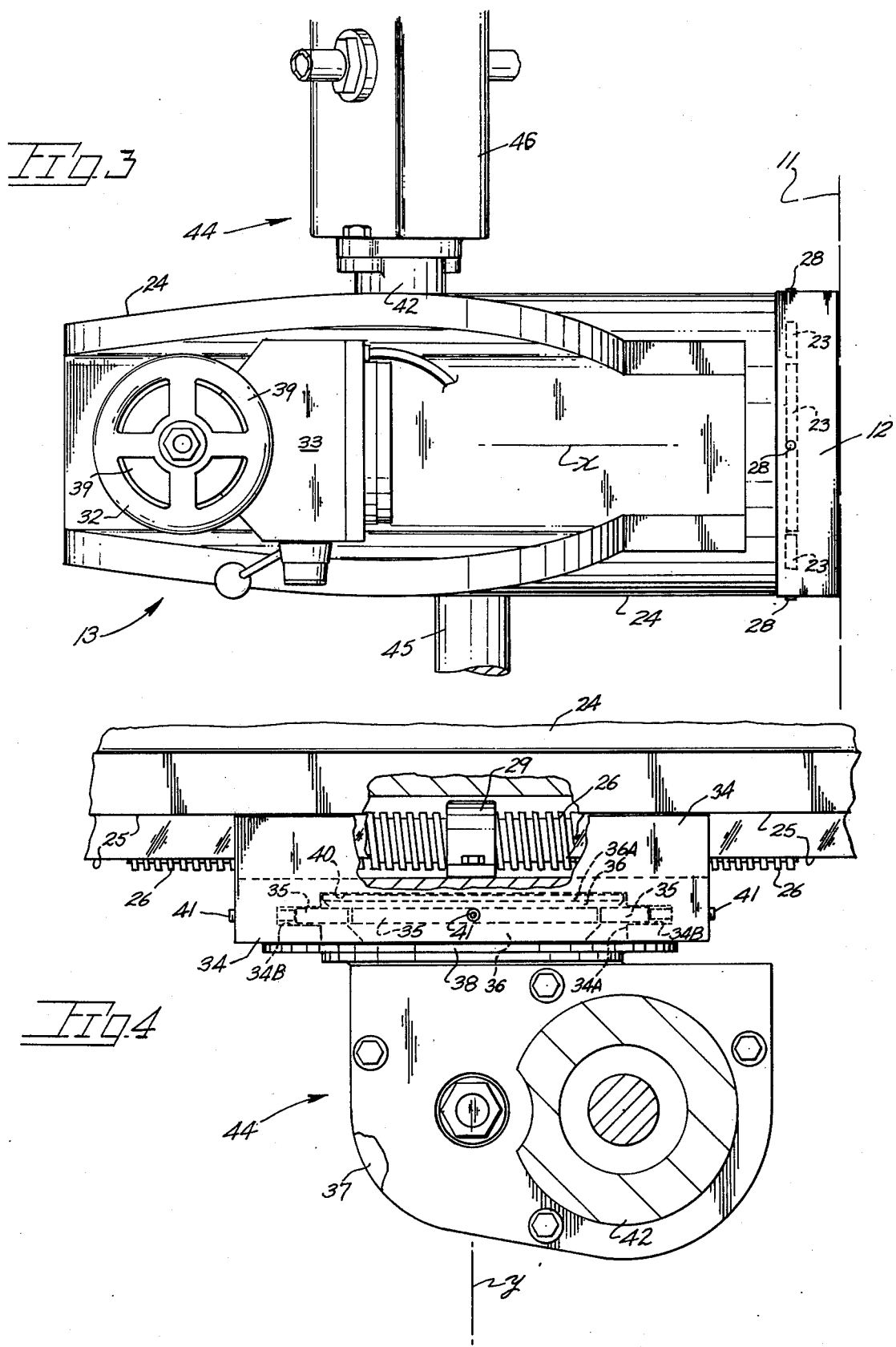

PORTABLE MULTI-PURPOSE MACHINE TOOL

BACKGROUND OF THE INVENTION

The present invention relates generally to machine tools of the type performing milling and boring operations and particularly to such a highly versatile machine tool adapted for temporary attachment to a large work piece structure.

Known in the prior art are various machines, usually of substantial size and complexity, intended for in place machining operations on large structures such as smokestacks, hoppers, pressure vessels where the machining operation is to be accomplished without structure disassembly. Such prior art machines are of a complex nature and intended primarily to perform specific milling and boring operations. Further, such machines do not lend themselves to temporary placement on a wide range of structures. Examples of such machines are disclosed in the following U.S. Pat. Nos.: 3,145,622; 3,382,768; 3,466,972; 3,617,142; and 3,687,007. A review of the prior art machines will indicate the same cannot be considered general purpose machine tools and, for the most part require heavy duty hoisting equipment for their positioning. A further drawback to known machines is their cost.

SUMMARY OF THE PRESENT INVENTION

The present invention is embodied within a machine tool particularly intended for use in place while attached to the work piece structure and capable of performing various milling and boring operations.

A bed of the machine is operational in the upright or horizontal position and embodies ways and a feed for a machine carriage having ways and a feed arrangement disposed transversely to said bed. A slide on the carriage ways mounts the inner end of a column. The column and slide are accordingly positionable transversely of the bed centerline as well as along the bed length. Additionally means on the slide and the column permit the column to be rotated and locked about an axis perpendicular to the machine bed. The column includes ways and a feed arrangement for advancing a powerhead slide for travel lengthwise of the column. A gear box of the powerhead serves to mount a power source such as a hydraulic motor in driven connection with a tool retaining spindle. Rotational adjustment between the powerhead and the gear box slide provides further flexibility to the machine's capabilities. The feed arrangements may be manual supplemented by automatic feed units to provide a variable speed traverse feature. Brackets enable attachment of the machine bed in an upright position on a work piece surface. Other temporary fastening arrangements for the bed may be used.

Important objectives of the present machine tool include: the provision of a machine tool of a compact nature which may be conveniently transported to a large, non-transportable structure for temporary attachment thereto during machining operations; the provision of a highly versatile machine tool capable of performing a multitude of drilling, boring and milling operations; the provision of a machine tool adapted to perform machining operations throughout a wide range of travel and along angularly related axes all without repositioning of the machine bed on the supporting work piece structure; the provision of a machine tool capable of machining to accepted machine shop tolerances while in place on the work piece structure to preclude costly disassembly and transport of the work piece to a machine shop, and; the provision of a machine tool having a powerhead positionable along mutually perpendicular axes and about still another axis to provide a high degree of tool maneuverability.

These and other objects will become apparent upon a reading and understanding of the following description of the invention.

BRIEF DESCRIPTION OF THE DRAWINGS

In the accompanying drawings:

FIG. 3 is a side elevational view of the column assembly showing the side opposite to that seen in FIG. 2; and FIG. 4 is a vertical sectional view taken along line 4—4 of FIG. 1 showing slide details.

DETAILED DESCRIPTION OF THE PREFERRED EMBODIMENT

Figure 1:
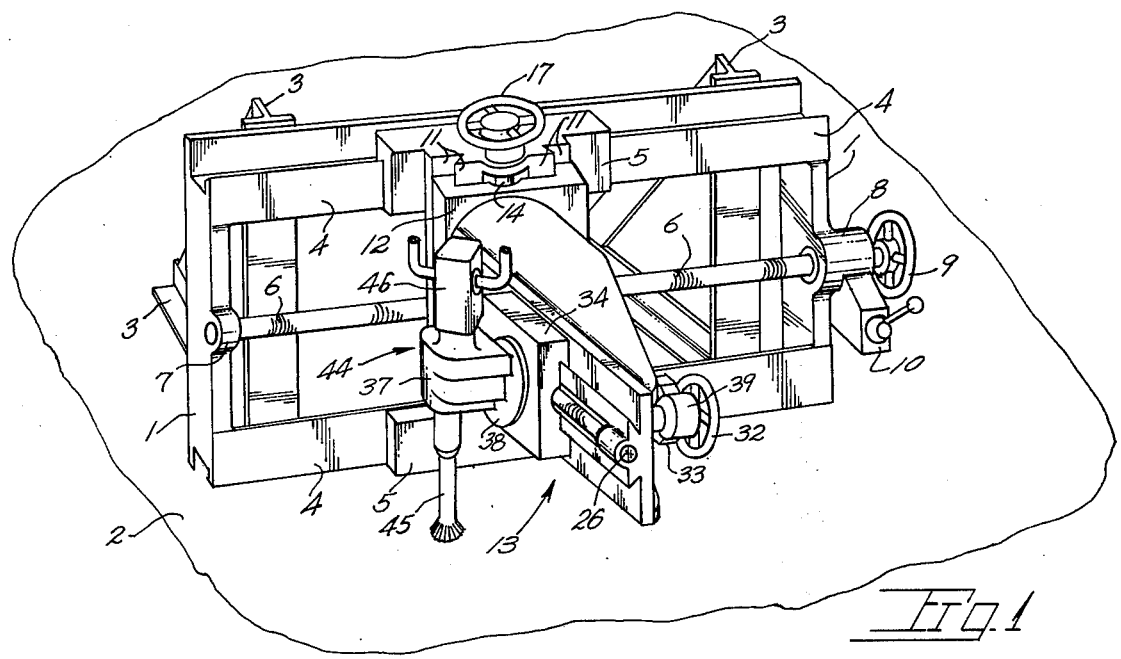
FIG. 1 is a perspective view of the present machine tool in place on a supporting work piece.
Figure 2:
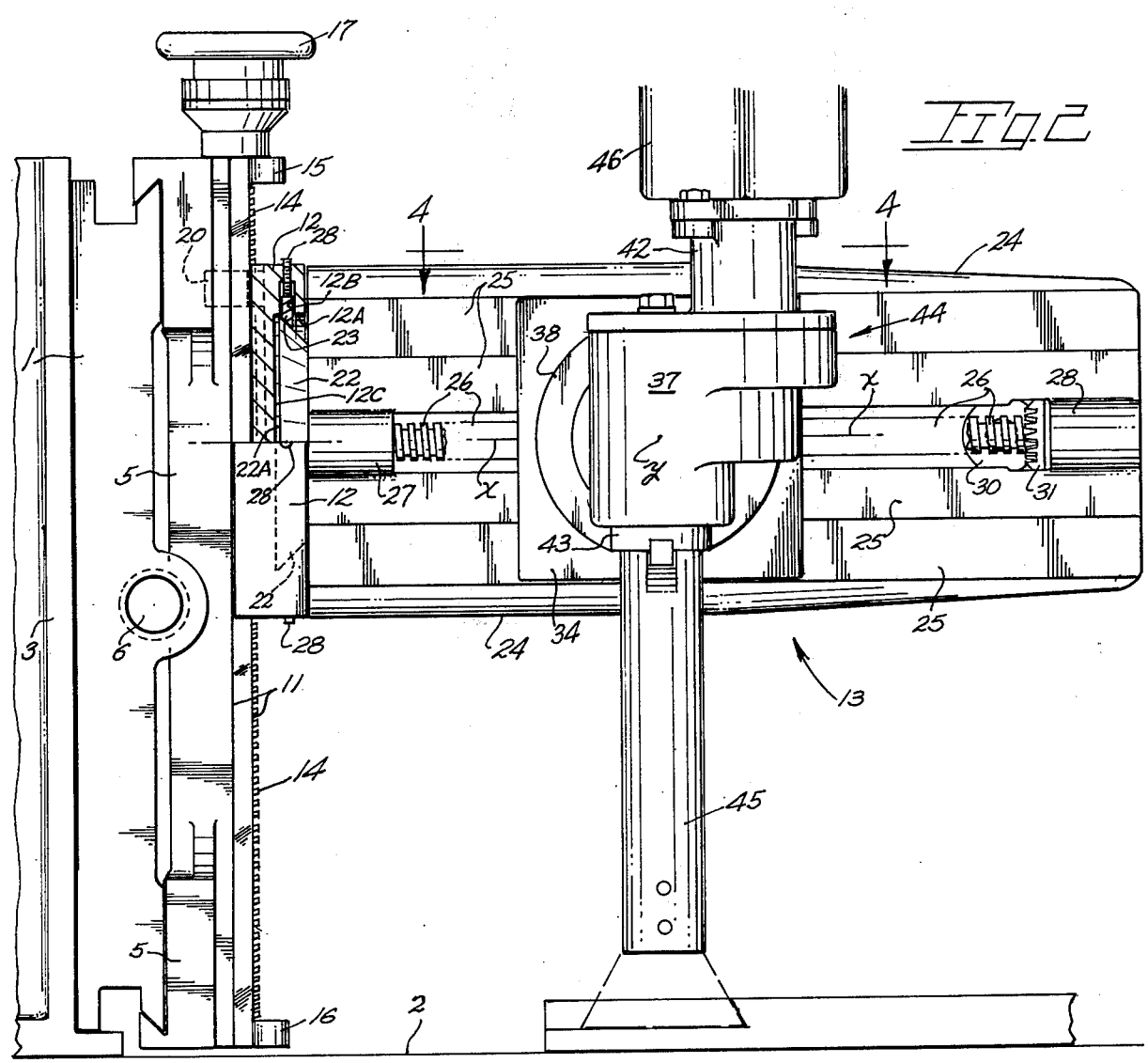
FIG. 2 is a side elevational view of the tool taken from the left hand side of FIG. 1.

With continuing reference to the accompanying drawing wherein applied reference numerals indicate parts similarly identified in the following specification, a bed is indicated at 1 shown in place on a work piece structure 2 which may be horizontal as shown or upright. Brackets at 3 supports the bed in place with temporary fastening means such as C-clamps being used to affect temporary bed-bracket securement. The brackets 3, in turn, may be suitably fastened as by tacking with welds. If desired, the bed may be disposed parallel to the work piece surface and fixed thereon by welds or other temporary fastening means.

Bed 1 is a casting closed at its ends and having a central bridging portion not shown. A pair of bed ways 4 support a transversely disposed carriage or saddle 5. The bed ways 4 and carriage are in dovetail, sliding connection to assure precise travel of the carriage lengthwise of the bed in response to the action of a bed feed screw 6 endwise journalled at 7 and 8 and rotated by a hand wheel 9 or an automatic feed unit at 10. The latter selectively drives the feed screw at variable speeds and provides for rapid traverse of the carriage along ways 4.

Carriage 5 is also a casting machined at 11 to provide carriage ways on which is entrained in a dovetail manner a slide block 12 of a column assembly generally at 13. A carriage feed screw 14 is suitably journalled adjacent the upper and lower ends 15 and 16 of the carriage with a hand wheel at 17 imparting manual rotation to feed screw 14. A feed nut at 20 affixed in a recessed manner to the backside of slide block 12 and imparts carriage traversing movement thereto. Accordingly, column assembly 13 may be positioned transversely of bed 13 as well as therealong by feed screw arrangements described. The ways on said bed and said carriage may be termed primary and secondary ways respectively.

Rotational movement of column assembly 13 is provided for by cooperating means at the column and column slide block interface. An annular, conical projection 22 machined on the inner or supported end of a column 24 seats within a circular recess 12A of column slide block 12. A radially extending groove 12B in annular communication with said recess receives a segmented locking ring 23 adapted for inward biased engagement with conical column projection 22 with an annular wall 22A. Set screws at 28, in each side of the slide block, bear on ninety degree lock ring segments 23. Inclined, inner conical surfaces on the lock ring segments cooperate with corresponding surfaces on projection 22 to bias the column projection into forceful contact with an internal circular wall 12C of the block to retain the column in a desired position about axis X. An advantage to the above column and slide block mounting arrangement is that it contributes to a low machine profile with closely coupled components.

Column assembly 13 includes column casting 24 having ways 25 thereon and a feed screw 26 suitably journalled at 27 adjacent the way ends. Miter gears at 30 and 31 impart rotational movement to feed screw 26. A hand wheel at 32 is supplemented by an automatic power feed unit 33 mounted on a column mounted housing 39 within which a miter gear carrying shaft is journalled.

In place on the dovetail ways 25 of the column is a slide 34 not dissimilar in structure and operation to earlier described slide block 12 of the carriage assembly. Slide 34 is machined on its backside in a dovetailed manner to slidably engage column ways 25 with a backside mounted feed nut 29 in engagement with feed screw 26. The exposed or frontal side of slide 34 defines an annular recess 34A having a radially extending groove 34B within which a segmented locking ring 35 is received.

A gear box at 37 is part of a powerhead assembly indicated generally at 44 and includes an integral circular plate 38. Mounting means for the powerhead assembly includes a concentrically formed circular dovetail extension 36 on plate 38 for disposition within slide block recess 34A whereat segmented locking ring 35, upon inward biasing by four set screws as at 41, seats said extension in abutment against a recess back wall 40. Accordingly, gear box 37 is positionable and lockable about an axis Y coaxial with circular extension 36 permitting the gear box and a tool carried by the powerhead assembly to be positioned and locked throughout 360 degrees about said axis. Operative tool movement is accomplished by actuation of the feeds earlier described which may be manually or automatically controlled. Extension 36 includes an annular rim 36A at its inner end. Gear box 37 of the powerhead assembly is adapted for supporting a power source such as the hydraulic motor indicated at 46 in place on a mount 42 which may be integral with a gear box closure. Driving and driven gears within the gear box may be journalled in an interchangeable manner to provide desired tool speeds which may also be accomplished by motor speed changes by suitable motor controls not shown. A tool holding spindle at 43 is of standard tapered configuration for the reception of various boring and milling tools as at 45 in a conventional manner.

In operation, bed 1 is affixed to the work piece either in place thereon or upright as shown in FIG. 1 with shimming if necessary. Positioning of carriage 5 and slide block 12 thereon in turn positions column assembly 13 in spaced relationship to the work piece. Rotational movement of column 24 about axis X as permitted by the slide block mounting arrangement for the column and enables positioning of the powerhead 44 about said axis for desired tool presentation. Further tool maneuverability is provided by the powerhead mounting on slide 34 which enables further powerhead positioning about axis Y.

When in place the locking means associated with slide block 12 and slide 34 are seated to secure associated components against undesired movement. Machining operations may then be initiated using the manual or automatic feeds.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A multi-purpose machine tool for attachment to a work piece at a work site, said machine tool comprising in combination,
   - a bed adapted for temporary attachment to a horizontal or inclined work piece surface and including ways and a feed arrangement,
   - angular bracket means for attachment to said bed and to the work piece,
   - a carriage also including ways and a feed arrangement and disposed transversely of said bed in sliding engagement with the bed ways for travel therealong, and
   - a column assembly comprising,
     - column slide means entrained on the carriage ways and positioned by the carriage feed,
     - a column supported at one end by said slide means and including ways formed therealong,
     - cooperating means on said column slide means and said one end of the column permitting rotational movement of the column about its major axis and subsequent locking of same against rotational movement,
     - a column feed,
     - a slide entrained on the column ways and positioned therealong by the column feed,
     - a powerhead assembly carried by said slide adapted to receive a powered tool, and
     - means mounting said powerhead to said slide permitting the powerhead assembly to be rotationally positioned and locked in place about an axis perpendicular to the column ways.

2. The multi purpose machine tool claimed in claim 1 wherein said cooperating means includes locking means for biased engagement with said one end of the column to lock same against rotation.

* * * * *